United States Patent
Czechowski et al.

(10) Patent No.: US 9,512,752 B2
(45) Date of Patent: Dec. 6, 2016

(54) INTEGRATED LUBRICATION MODULE FOR COMPRESSORS

(71) Applicant: Ingersoll-Rand Company, Davidson, NC (US)

(72) Inventors: Edward S. Czechowski, Orchard Park, NY (US); Robert M. Kolodziej, Amherst, NY (US); Michael Nuchereno, Amherst, NY (US)

(73) Assignee: Ingersoll-Rand Company, Davidson, NC (US)

(*) Notice: Subject to any disclaimer, the term of this patent is extended or adjusted under 35 U.S.C. 154(b) by 230 days.

(21) Appl. No.: 13/952,485

(22) Filed: Jul. 26, 2013

(65) Prior Publication Data

US 2014/0034421 A1 Feb. 6, 2014

Related U.S. Application Data

(63) Continuation of application No. 13/217,202, filed on Aug. 24, 2011, now Pat. No. 8,496,089, which is a
(Continued)

(51) Int. Cl.
*F01M 5/00* (2006.01)
*F16N 39/02* (2006.01)
*F16N 39/06* (2006.01)

(52) U.S. Cl.
CPC .............. *F01M 5/002* (2013.01); *F16N 39/02* (2013.01); *F16N 39/06* (2013.01)

(58) Field of Classification Search
CPC ........... F01M 5/002; F16N 39/02; F16N 39/06
(Continued)

(56) References Cited

U.S. PATENT DOCUMENTS 2,217,329 A * 10/1940 Bentley ..................... F16N 7/40
                                                            184/6.28
2,679,320 A * 5/1954 Walton ..................... B01D 25/00
                                                            210/102
(Continued)

FOREIGN PATENT DOCUMENTS

| EP | 0838577 B1 | 4/1998 |
| EP | 1362993 A1 | 11/2003 |
| WO | 95/10729 A1 | 4/1995 |

OTHER PUBLICATIONS

Singapore Search Report and Written Opinion for Application No. 201004767-8, mailed on Apr. 17, 2012.
(Continued)

*Primary Examiner* — Michael Riegelman
(74) *Attorney, Agent, or Firm* — Taft Stettinius & Hollister LLP

(57) ABSTRACT

In accordance with certain embodiments, the present invention provides a modular approach to a lubrication package. Certain components such as the filter and cooler are directly connected to a block that has connections to accept them and internal porting to establish the proper flow paths for circulation, cooling and filtration of the circulating lubricant. The block can accept one or more coolers and one or more filters. The isolation valving for redundant equipment can also be integrated into the block. Many connections that had been used in past designs for the piping network are integrated into the block. The block can also be close mounted to the reservoir while a submersible pump further saves space and piping connections. Indeed, having the ability to maintain mechanical equipment (e.g., remove and replace filters and coolers) without shutting down, allows for continuous process flow, which eliminates down-town scheduling, loss of product and/or redundant backup, all of which comes at a considerable cost.

12 Claims, 6 Drawing Sheets

Related U.S. Application Data continuation of application No. 12/944,658, filed on Nov. 11, 2010, now Pat. No. 8,069,949, which is a continuation of application No. 11/356,507, filed on Feb. 17, 2006, now Pat. No. 7,854,299.

(58) Field of Classification Search
USPC ...... 184/6.16, 6.28, 6; 417/243; 137/625.46, 137/887
See application file for complete search history.

(56) References Cited

U.S. PATENT DOCUMENTS

| | | | |
|---|---|---|---|
| 3,223,197 A * | 12/1965 | Conover | F01M 1/02 184/104.3 |
| 3,331,364 A | 7/1967 | Chariatte | |
| 4,287,908 A * | 9/1981 | Storgard | F02M 37/0023 137/255 |
| 4,324,213 A * | 4/1982 | Kasting | B01D 35/12 123/196 A |
| 4,370,957 A * | 2/1983 | Skatsche | F02B 77/14 123/196 AB |
| 4,424,778 A * | 1/1984 | Yoshida | F01P 11/08 123/196 AB |
| 5,219,040 A | 6/1993 | Meuer et al. | |
| 5,332,064 A | 7/1994 | Liu | |
| 5,855,226 A * | 1/1999 | Palmer | F15B 9/10 137/596.14 |
| 6,010,320 A * | 1/2000 | Kwon | F04C 23/00 184/6.16 |
| 6,221,130 B1 * | 4/2001 | Kolodziej | B01D 53/261 95/120 |
| 6,273,139 B1 | 8/2001 | Ohmi et al. | |
| 6,290,208 B1 * | 9/2001 | Arnett | B01D 35/12 137/625.11 |
| 6,485,636 B1 * | 11/2002 | Moss | B01D 35/12 210/117 |
| 6,623,251 B2 | 9/2003 | Nawamoto et al. | |
| 6,941,922 B2 * | 9/2005 | Williams | F01M 1/02 123/196 R |
| 6,973,908 B2 | 12/2005 | Paro | |
| 7,854,299 B2 | 12/2010 | Czechowski et al. | |
| 8,069,949 B2 | 12/2011 | Czechowski et al. | |
| 9,016,245 B2 * | 4/2015 | Van Farowe | F01P 11/08 123/41.33 |
| 2003/0131819 A1 | 7/2003 | Paro | |
| 2003/0143085 A1 * | 7/2003 | Fletcher | F04B 53/06 417/307 |
| 2003/0234008 A1 * | 12/2003 | Van Winkle | F01P 9/00 123/559.1 |
| 2007/0187181 A1 | 8/2007 | Brendel | |
| 2008/0006229 A1 * | 1/2008 | Wilmink | B01D 35/153 123/41.33 |
| 2009/0014244 A1 * | 1/2009 | Cavarello | B01D 35/12 184/6 |
| 2015/0184802 A1 * | 7/2015 | Leising | F01M 5/002 184/6.22 |

OTHER PUBLICATIONS

Great Britain Examination Report for Application No. GB0814970.0, dated Jun. 28, 2011.
Great Britain Examination Report for Application No. GB0814970.0, dated Jun. 17, 2010.

* cited by examiner

INTEGRATED LUBRICATION MODULE FOR COMPRESSORS

CROSS-REFERENCE TO RELATED APPLICATIONS

This application is a continuation of U.S. patent application Ser. No. 13/217,202, entitled "Integrated Manifold for Compressors", filed Aug. 24, 2011, which is herein incorporated by reference in its entirety, which is a continuation of U.S. patent application Ser. No. 12/944,658, entitled "Integrated Manifold for Compressors", filed Nov. 11, 2010, which issued as U.S. Pat. No. 8,069,949 on Dec. 6, 2011, which is herein incorporated by reference in its entirety, which is a continuation of U.S. patent application Ser. No. 11/356,507, entitled "Integrated Manifold for Compressors", filed Feb. 17, 2006, which issued as U.S. Pat. No. 7,854,299 on Dec. 21, 2010, which is herein incorporated by reference in its entirety.

BACKGROUND

The field of this invention is compressors packaged with lubrication systems that typically include a lubricant reservoir, circulation equipment, cooling equipment, filtration equipment and associated controls, for example.

Typically, compressors are packaged in one or more skids to reduce installation time in the field. A typical assembly for a multi-stage centrifugal compressor package will include the compressors and the intercoolers for the compressed gas, a lubrication system for the compressors, as well as a drive system and associated gearbox to drive the various stages, for example. These assemblies can also feature redundant equipment so that maintenance can go on with the compressor running. For example, in the lubrication system there can be dual circulation pumps, coolers, filters and associated controls. Even if prepackaged by the original equipment manufacturer, the lubrication system has literally hundreds of connections to complete the lubrication piping as well as the coolant piping and the associated instrumentation and control connections. Apart from the issue of the sheer number of connections is the question of how much space is taken up by various components. Frequently, because of shipping requirements to remote locations, the physical size and footprint of the overall package and its components are factors. Moreover, such concerns arise not only during transport but also because of space constraints at the ultimate destination. This is particularly the case in an offshore rig environment.

Some space saving advances have been made. FIG. 1 illustrates a prior design showing an oil tank 10 and two shell and tube oil coolers 12 and 14 and an oil pump 16. Just some of the interconnecting piping is shown in this view. While some space has been saved in more recent modules by replacing the shell and tube coolers with brazed plate designs that take up considerably less volume, the number of connections has not been markedly reduced, and opportunities exist to economize on space and reduce the number of connections.

SUMMARY OF THE INVENTION

In accordance with certain embodiments, the present invention addresses such issues and, as those skilled in the art will appreciate, provides solutions for rapid assembly with fewer connections while packaging the components in a smaller occupied volume. These features will be readily understood by a review of the description of exemplary embodiments and the drawings that illustrate them, as well as by a review of the associated claims that define various aspects of the invention.

By way of example, the present invention provides a modular approach to a lubrication package. Certain components such as the filter and cooler are directly connected to a block that has connections to accept them and internal porting to establish the proper flow paths for circulation, cooling and filtration of the circulating lubricant. The block can accept one or more coolers and one or more filters. The isolation valving for redundant equipment can also be integrated into the block. Many connections that had been used in past designs for the piping network are integrated into the block. The block can also be close mounted to the reservoir while a submersible pump further saves space and piping connections.

BRIEF DESCRIPTION OF THE DRAWINGS

These and other features, aspects, and advantages of the present invention will become better understood when the following detailed description is read with reference to the accompanying drawings in which like characters represent like parts throughout the drawings, wherein.

DETAILED DESCRIPTION

Figure 1:
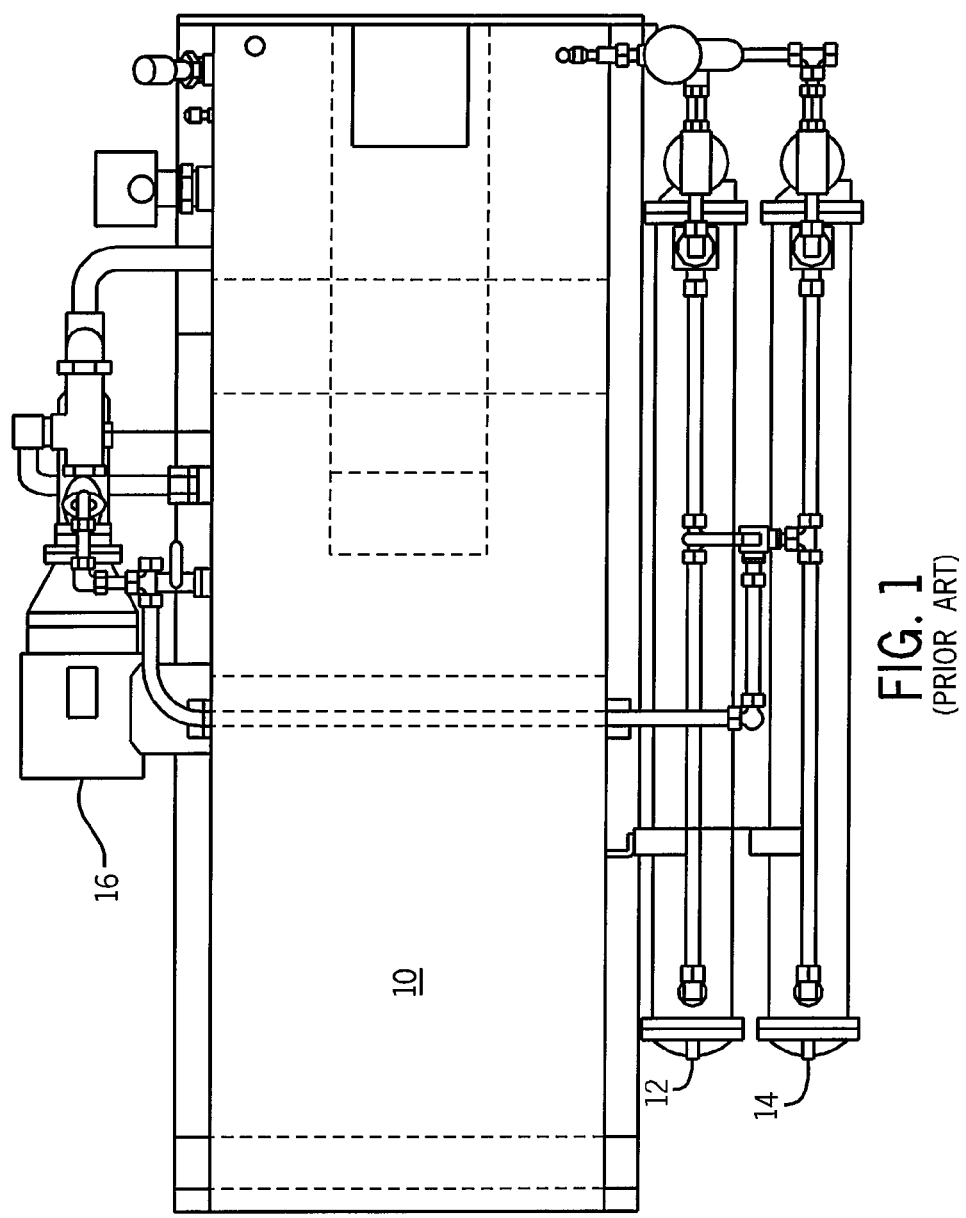
FIG. 1 is a plan view of a prior art lubricant circulation system showing the myriad connections and the space occupied.
Figure 2:
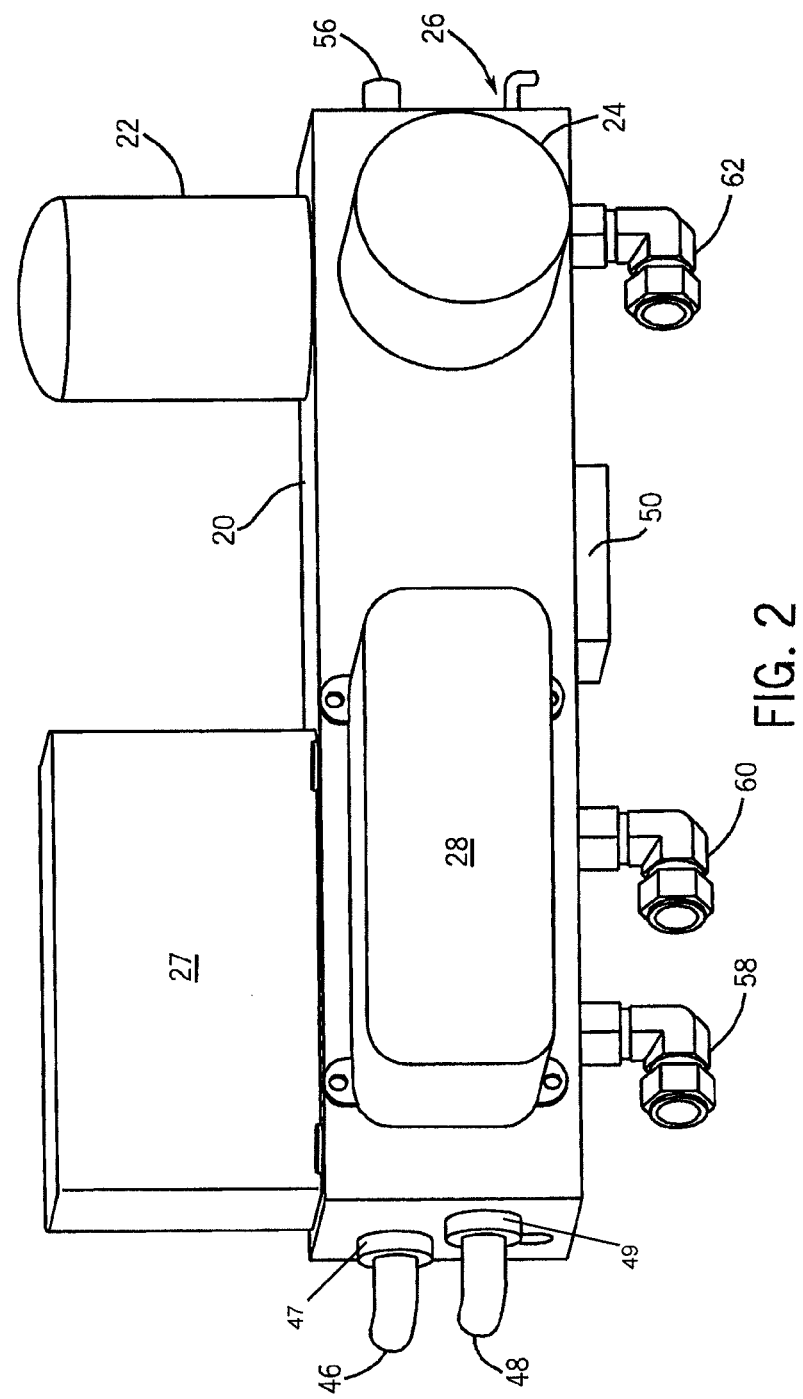
FIG. 2 shows an exemplary block of the present invention used with tandem coolers and filters, in accordance with an embodiment of the present invention.

Turning to FIG. 2, this figure illustrates an exemplary block 20 that has been appropriately produced to include internal passages to properly route lubricant or coolant therethrough and in the proper order to the connected components. There are two filters 22 and 24 that are directly mounted to the block with a gasket (not shown) that can be on the filter or on the block. The mounting method, for example, can be a spin on technique where the block features a threaded nipple that the filters 22 or 24 spin onto. In doing the filter mounting this way, interconnecting piping that used to connect the filters to the other components in the lubrication package will be eliminated. A valve that isolates one filter and lines up the other, preferably with a 90 degree turn of a handle 26 extending from multi-port valves (not shown) can be used to block an inlet and outlet to one filter, such as 22, so it can be pulled off the block 20 while the spare 24 is put in service. With proper alignment of multi-port valves in block 20, a 90 degree rotation, for instance, can quickly switch flow between filters with no piping external to block 20.

Figure 3:
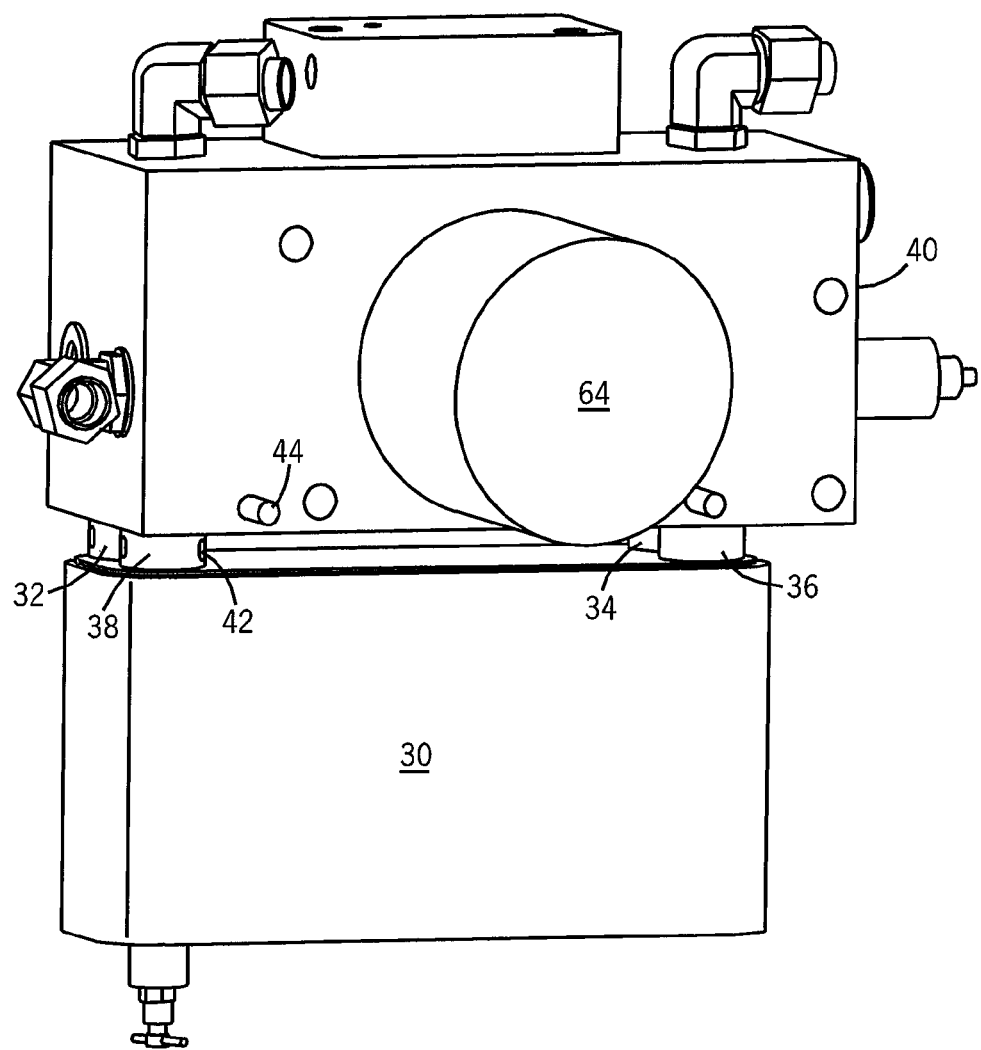
FIG. 3 shows an exemplary block of the present invention with a single cooler and filter, in accordance with an embodiment of the present invention.

The coolers 27 and 28 are shown flush mounted to block 20. FIG. 3 shows how they can be connected quickly. Here a cooler 30 has four extending bosses 32, 34, 36, and 38. Each boss has a ring gasket (not shown) at its upwardly oriented face for ultimate contact with a recessed sealing surface (not shown) in the block 40. A typical boss such as 38 can have a recess or a flat 42 so that when the cooler 30 is fully advanced into the block 40 the retaining rod 44 can be advanced to engage the recess or flat 42 to hold the cooler 30 securely to the block 40. Those skilled in the art will appreciate that there are alternative ways to secure the cooler 30 to the block 40. The unique feature is that they slide together with no interconnecting piping. That way they fit up fast, take less space and provide fewer joints for potential leakage.

Referring back to FIG. 2, when there are multiple coolers 27 and 28, handles 46 and 48 can with a quarter turn operate tandem valves 47, 49 respectively on the oil side and the coolant side of the coolers 27 and 28 to put either one or the other in service and to allow the other one to be physically removed with lubricant and coolant still circulating, for instance. Here again the valving between the coolers is internal to the block and is simple to operate for a change over and involves less space and fewer connections than packaged designs in the past.

Another feature is the incorporation of the thermal block 50 into the block 20. Here again there is no piping external to the block 20 to secure the thermal block 50 which serves as a lubricant temperature control with an internal bypassing of the particular cooler that is in service done internally within block 20.

Figure 5:
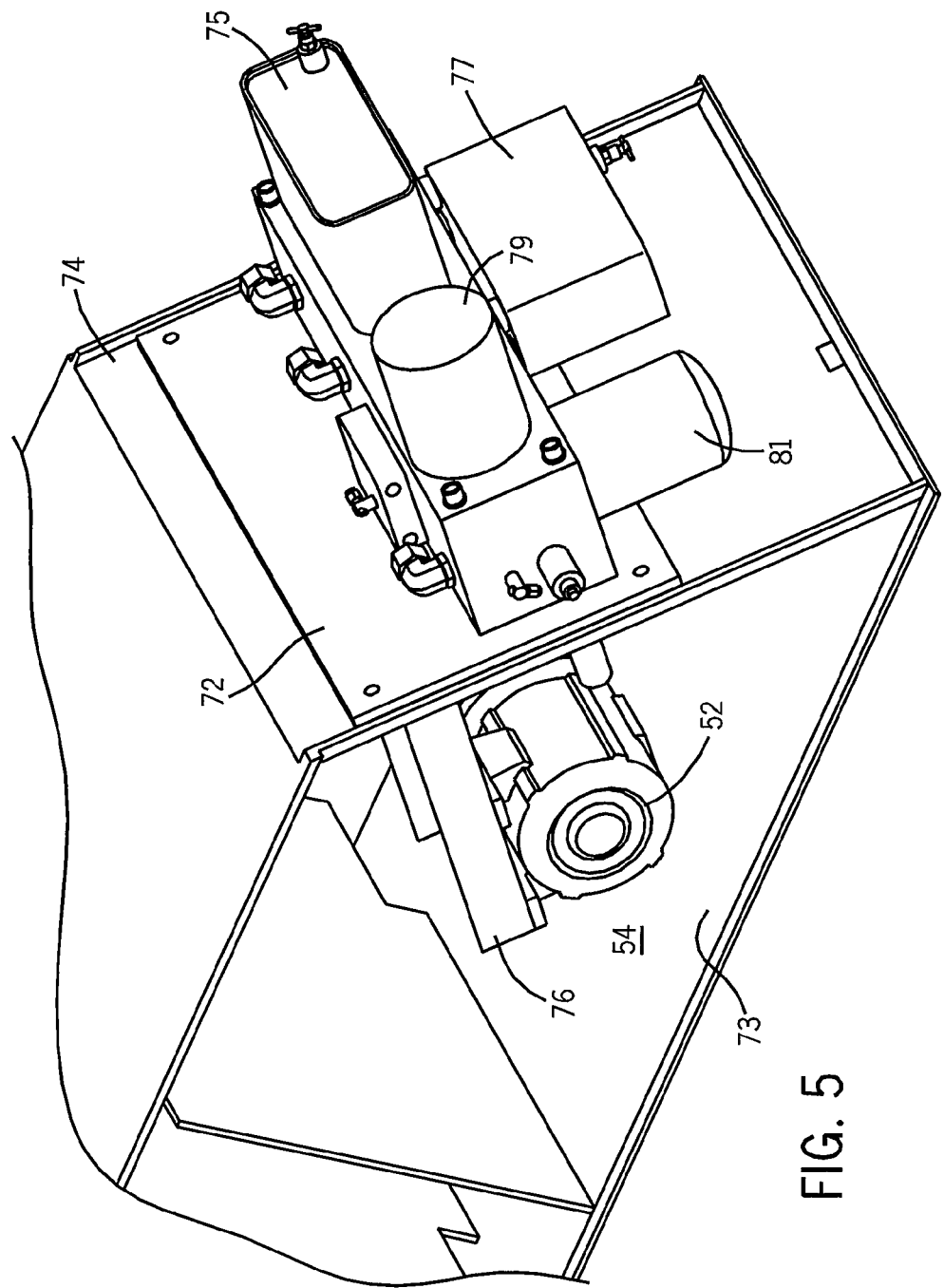
FIG. 5 shows the block of FIG. 2 mounted to a lubricant tank having a submersible pump within and supported from a common plate as the block.

Additionally, pressure relief can also be incorporated into the cooler that allows pressure on the discharge of the pump 52 go into a passage leading to the sump 54, both shown in FIG. 5. What can go into block 20 is a relief valve 56 that can have inlet and outlet ports lined up with appropriate ports in the block 20 so that no external piping is required for the relief circuit.

In the end, as shown in FIG. 2, there simply needs to be four connections made in the field for coolant in and out, which are connections 58 and 60 and two others for the lubricant, only one 62 being visible in FIG. 2.

Figure 4:
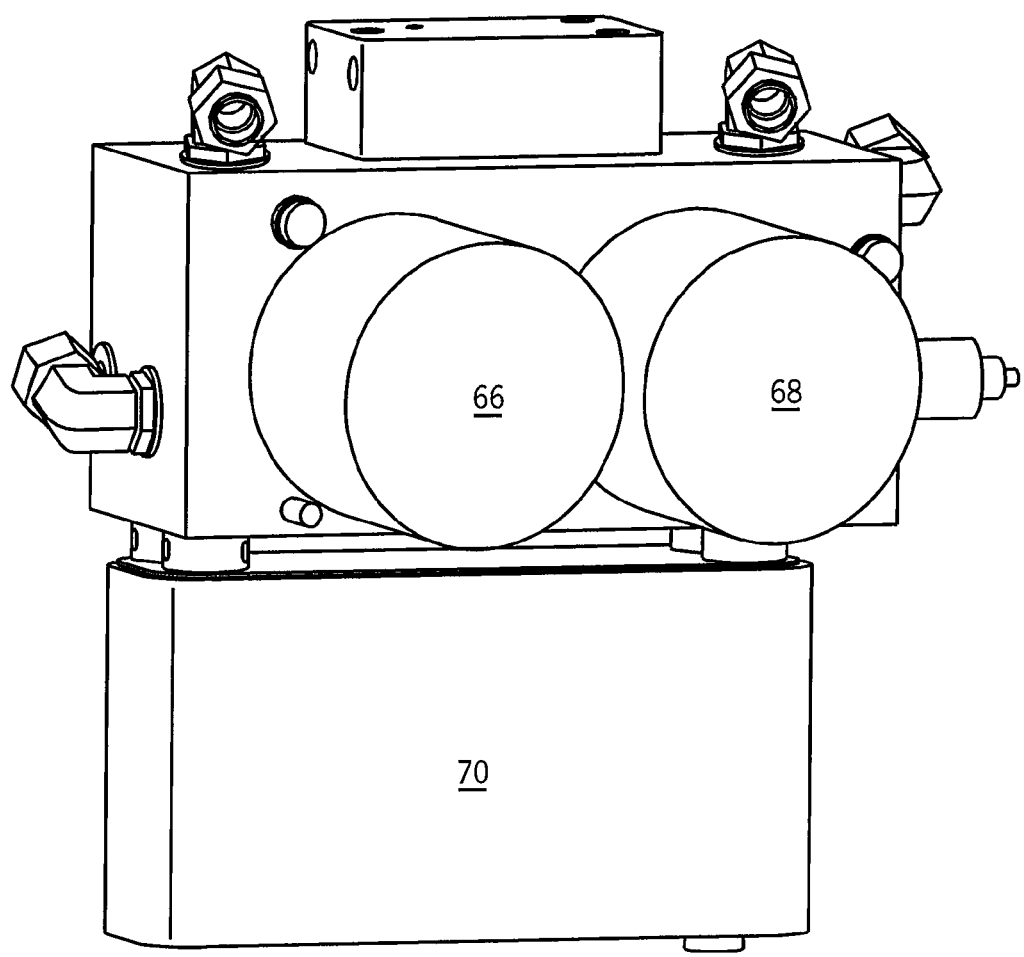
FIG. 4 shows an exemplary block of the present invention with a single cooler and dual filters, in accordance with an embodiment of the present invention.

FIG. 3 is simply a variation of FIG. 2 using 1 filter 64 and one cooler 30. Using this layout requires equipment shutdown for servicing. The other FIG. 2 concepts carry over to FIG. 3. The FIG. 4 design actually shows the four connections for coolant and lubricant and tandem filters 66 and 68. In this design a filter change can be made on the fly but servicing the cooler 70 will require the equipment to be shut down.

FIG. 5 shows the variation of FIG. 2 mounted on a support plate 72 that is secured to the sump 54 on sloping panel 74 with a generally flat bottom 73 that defines its footprint. A support member 76 extends from plate 72 into sump 54 to support submersible pump 52. Having pump 52 inside sump 54 saves space as does the sloping panel 74 that makes room for the equipment described in FIG. 2. Because of the sloping panel 74 the equipment such as coolers 75 and 77 or filters 79 and 81 do not overhang the footprint 73. Additionally, inlet piping to the pump 52 is eliminated and the entire assembly is easy to service as it all comes out in one piece after the connections, three of the four are shown.

Figure 6:
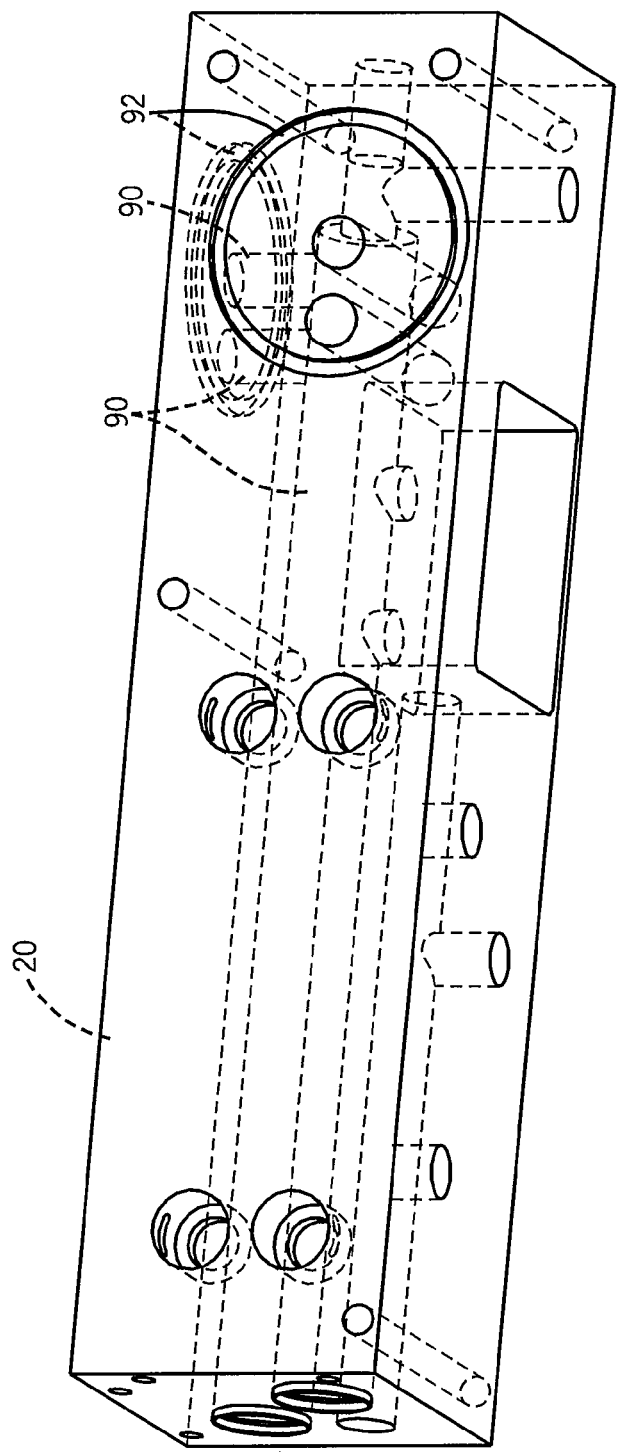
FIG. 6 illustrates a transparent view of an exemplary block for receiving various components, in accordance with an embodiment of the present invention.

Turing to FIG. 6, this figure illustrates some of the internal passages 90 of an exemplary block 20. As illustrated, the filters 22 (see FIG. 2) can be secured to the filter receiving portion 92 of the block, at which point the filters 22 will be coupled to the internal passages 90 of the block 20. Thus, these passages facilitate modularized assembly of the unit without the need for unwieldy piping assemblies. Indeed, with the primary plumbing network of the assembly defined by the internal passages 90 of the block 20, parts can more easily be removed and replaced when damaged. Moreover, components, such as the cooler 27 (see FIG. 2), can be removed from one block 20 and placed on another block, as the components are modularized.

Those skilled in the art can see that the present invention allows for space to be saved when packaging components particularly when redundant equipment is called for. While a lubrication system for rotating equipment is illustrated, other systems can benefit from the modular concept illustrated. Using the block and hooking up the equipment as described not only saves space but reduces the number of connections and facilitates rapid assembly of the skid in the field for hookup of process or utility connections. Again, the block concept is particularly suited to packages of equipment that are remotely assembled from where the unit is ultimately operated. While the certain embodiment encompass a lubrication assembly for a multi-stage centrifugal compressor, those skilled in the art will appreciate that the block concept can be adapted for lubrication systems for other types of rotating, reciprocating and mechanical requiring lubrication. Alternatively, the block can be integral to a process equipment skid delivered to a remote location and can allow a variety of process equipment to be compactly packaged while minimizing external connections to the block while simplifying the piping if not totally eliminating external piping between the components. Diversion valving between redundant pieces of equipment can also be configured internally to the block with extending handles where each handle can be used to turn inlet and outlet to one piece of equipment while aligning its redundant into service. In some cases this can be done with a 90 degree turn on a single handle to isolate lubricant or coolant from one cooler to another. Also possible is reducing the conversion operations between coolers to a single handle that can operate valves on both coolant and process sides of an exchanger in a single motion preferably 90 degrees. Filters or other pairs of redundant equipment can be handled in the same manner. As an alternative way to switch between redundant pieces of equipment shuttle valves can be used within a block. An integrated piston can be mounted to the block to move a shuttle valve to change alignment between pieces of redundant equipment.

Referring again to FIG. 5, the ability to support all the equipment on a single plate 74 allows for rapid installation and assembly or when maintenance is needed the entire module can be rapidly disconnected and a replacement installed to get a system back in service. Thus, apart from the space saving features of using a block, the further modularization of the components on a common base 72 facilitates original assembly or subsequent maintenance.

It should be further noted that the advantage of the block concept is that process equipment can be mounted "directly" to it. In this context, mounting directly means that the equipment is received by the block in a sealing relationship by bringing them together without the need to install intermediate piping or fittings. The process equipment is abutted or spun on and at most fasteners are used to secure the two together. The need for pipe fitters is reduced and the number of connections is also reduced as well as the volume occupied by the module that comprises the block and the process equipment connected to it.

While the preferred embodiment has been set forth above, those skilled in art will appreciate that the scope of the invention is significantly broader and as outlined in the claims which appear below.

Again, the above description is illustrative of exemplary embodiments, and many modifications may be made by those skilled in the art without departing from the invention whose scope is to be determined from the literal and equivalent scope of the claims below.

The invention claimed is:

1. A system, comprising:
a manifold, comprising:
   a block;
   a plurality of fluid ports disposed on the block, wherein the plurality of fluid ports couple to one or more internal passages extending through the block;
   a first filter interface on the block, wherein the filter interface is configured to connect a first filter directly to the block in fluid communication with a first filter port of the plurality of ports;
   a first cooler interface on the block, wherein the first cooler interface is configured to connect a first cooler directly to the block in fluid communication with a first cooler port of the plurality of ports;
   a second cooler interface on the block, wherein the second cooler interface is configured to connect a second cooler directly to the block in fluid communication with a second cooler port of the plurality of ports;
   a first valve receptacle positioned in the block having a first valve mounted therein, the first valve in fluid communication with the one or more internal passages of the block and configured to control a fluid flow associated with the first cooler; and
   a second valve receptacle positioned in the block having a second valve mounted therein, the second valve in fluid communication with the one or more internal passages of the block and configured to control a fluid flow associated with the second cooler.

2. The system of claim 1, comprising a thermal control module interface on the block, wherein the thermal control module interface is configured to connect a thermal control module directly to the block.

3. The system of claim 2, comprising the thermal control module directly coupled to the block.

4. The system of claim 2, wherein the thermal control module is configured to control a fluid temperature of a fluid flow through the one or more internal passages of the block.

5. The system of claim 1, comprising a second filter interface on the block, wherein the second filter interface is configured to connect a second filter directly to the block in fluid communication with a second filter port of the plurality of ports.

6. The system of claim 5, comprising the first filter directly coupled to the block along the first filter interface, and the second filter directly coupled to the block along the second filter interface.

7. A system, comprising:
a manifold, comprising:
   a block;
   a plurality of fluid ports disposed on the block, wherein the plurality of fluid ports couple to one or more internal passages extending through the block;
   a first filter interface on the block, wherein the filter interface is configured to connect a first filter directly to the block in fluid communication with a first filter port of the plurality of ports;
   a first cooler interface on the block, wherein the first cooler interface is configured to connect a first cooler directly to the block in fluid communication with a first cooler port of the plurality of ports;
   a second filter interface on the block, wherein the second filter interface is configured to connect a second filter directly to the block in fluid communication with a second filter port of the plurality of ports;
wherein the first filter interface is disposed on a first wall, the second filter interface is disposed on a second wall, and the first and second walls are nonparallel relative to one another.

8. A system, comprising:
a manifold, comprising:
   a block;
   a plurality of fluid ports disposed on the block, wherein the plurality of fluid ports couple to one or more internal passages extending through the block;
   a first filter interface on the block, wherein the filter interface is configured to connect a first filter directly to the block in fluid communication with a first filter port of the plurality of ports;
   a first cooler interface on the block, wherein the first cooler interface is configured to connect a first cooler directly to the block in fluid communication with a first cooler port of the plurality of ports;
   a second cooler interface on the block, wherein the second cooler interface is configured to connect a second cooler directly to the block in fluid communication with a second cooler port of the plurality of ports; and
wherein the first cooler interface is disposed on a first wall, the second cooler interface is disposed on a second wall, and the first and second walls are nonparallel relative to one another.

9. A system, comprising:
a manifold, comprising:
   a block;
   a plurality of fluid ports disposed on the block, wherein the plurality of fluid ports couple to one or more internal passages extending through the block;
   a first interface on the block, wherein the first interface is configured to connect a first fluid processing unit directly to the block in fluid communication with a first port of the plurality of ports;
   a second interface on the block, wherein the second interface is configured to connect a second fluid processing unit directly to the block in fluid communication with a second port of the plurality of ports;
   a thermal control module interface on the block, wherein the thermal control module interface is configured to connect a thermal control module directly to the block; a sump housing having a perimeter wall; and wherein the block is connected to the perimeter wall of the sump and at least one of the internal passages in the block is in fluid communication with the sump housing;
a first filter connected directly to the block;
a second filter connected directly to the block;
a first valve receptacle positioned in the block having a first valve mounted therein, the first valve in fluid communication with the one or more internal passages of the block and configured to control a fluid flow associated with the first filter; and a second valve receptacle positioned in the block having a second valve mounted therein, the second valve in fluid communication with the one or more internal passages of the block and configured to control a fluid flow associated with the second filter.

10. The system of claim 9, wherein the first and second interfaces comprise first and second filter interfaces, first and second cooler interfaces, or a filter interface and a cooler interface.

11. A system, comprising:
a manifold, comprising:
a block;
a plurality of fluid ports disposed on the block, wherein the plurality of fluid ports couple to one or more internal passages extending through the block;
a first interface on the block, wherein the first interface is configured to connect a first fluid processing unit directly to the block in fluid communication with a first port of the plurality of ports;
a first valve receptacle directly in the block, wherein the first valve receptacle is configured to mount a first valve directly into the block in fluid communication with the one or more internal passages of the block in association with the first fluid processing unit;
a second interface on the block, wherein the second interface is configured to connect a second fluid processing unit directly to the block in fluid communication with a second port of the plurality of ports;
a second valve receptacle directly in the block, wherein the second valve receptacle is configured to mount a second valve directly into the block in fluid communication with the one or more internal passages of the block in association with the second fluid processing unit;
a sump for holding a fluid;
wherein the block is coupled to an external portion of the sump and at least one of the internal passages is in fluid communication with the sump; and
wherein the first interface is disposed on a first wall, the second interface is disposed on a second wall, and the first and second walls are nonparallel relative to one another.

12. The system of claim 11, wherein the first and second interfaces comprise first and second filter interfaces, first and second cooler interfaces, or a filter interface and a cooler interface.

* * * * *